United States Patent Office 2,752,377
Patented June 26, 1956

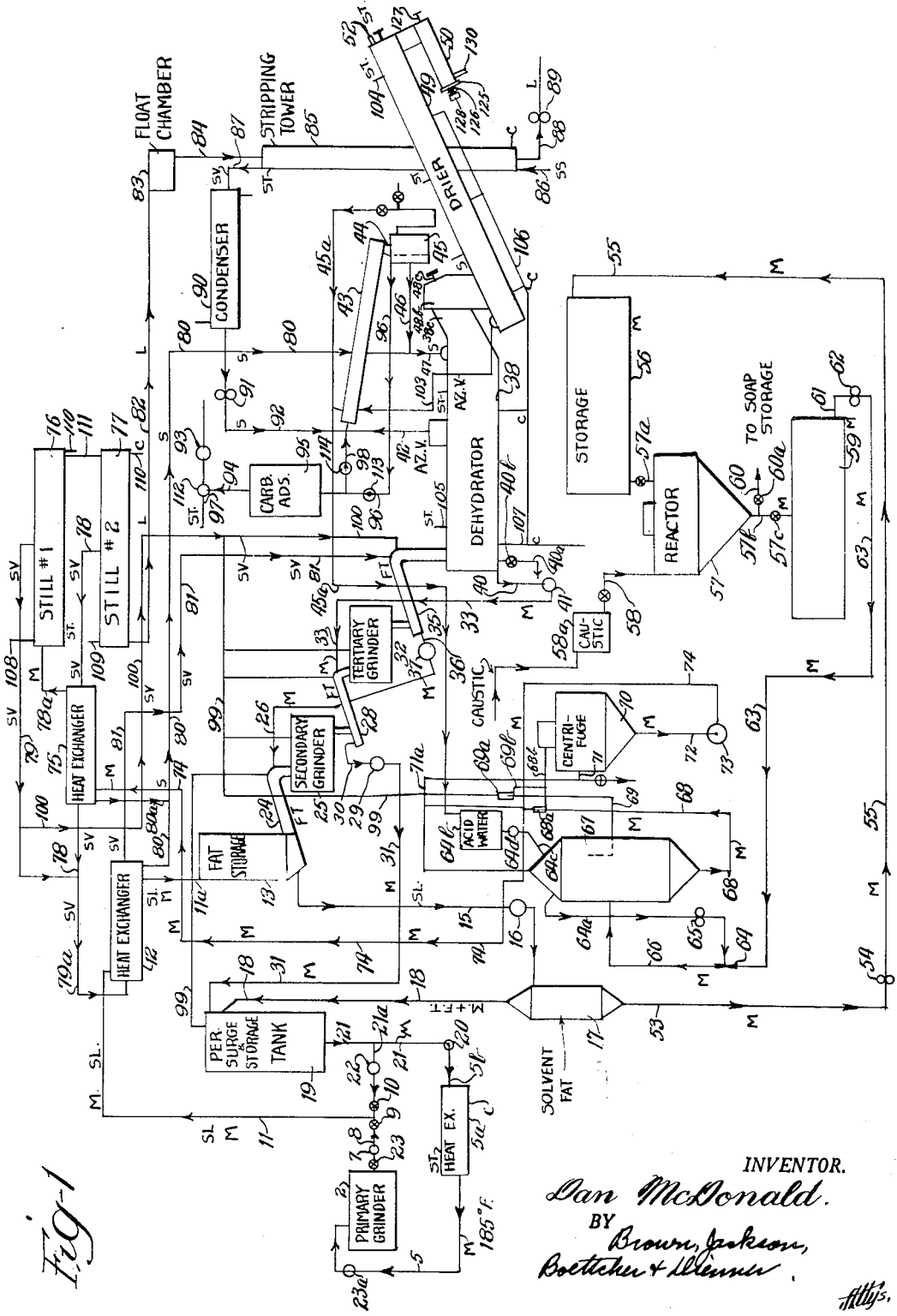

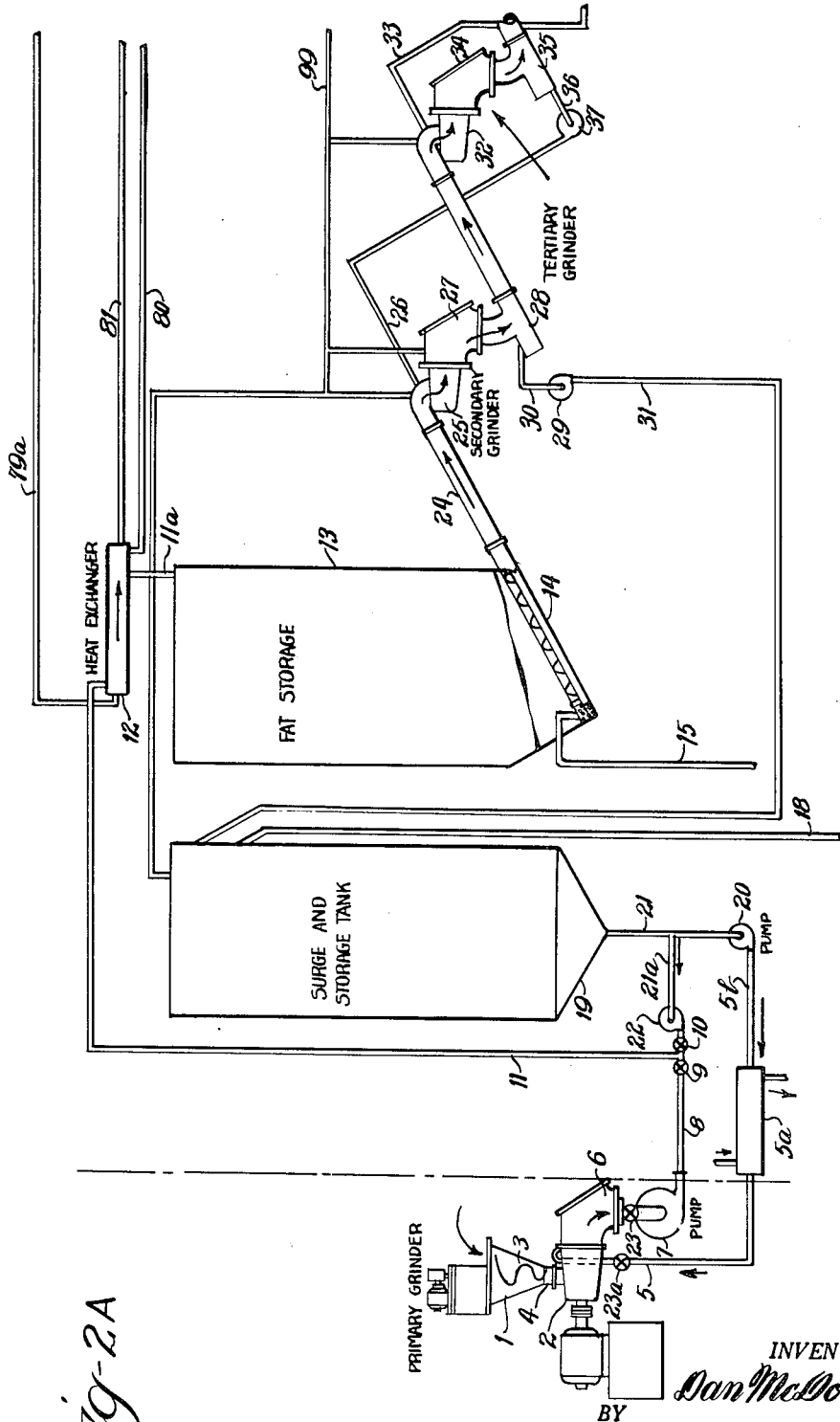

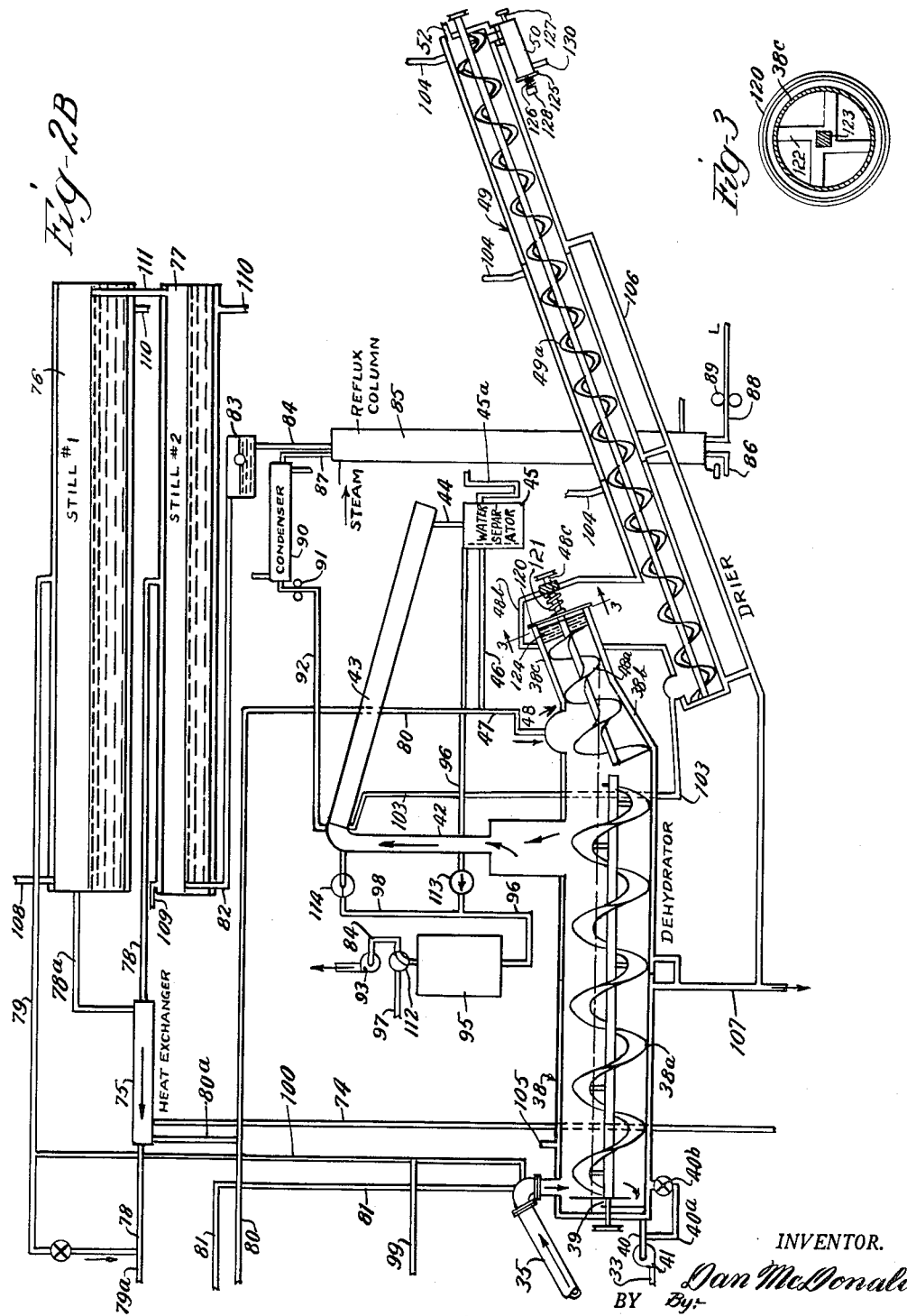

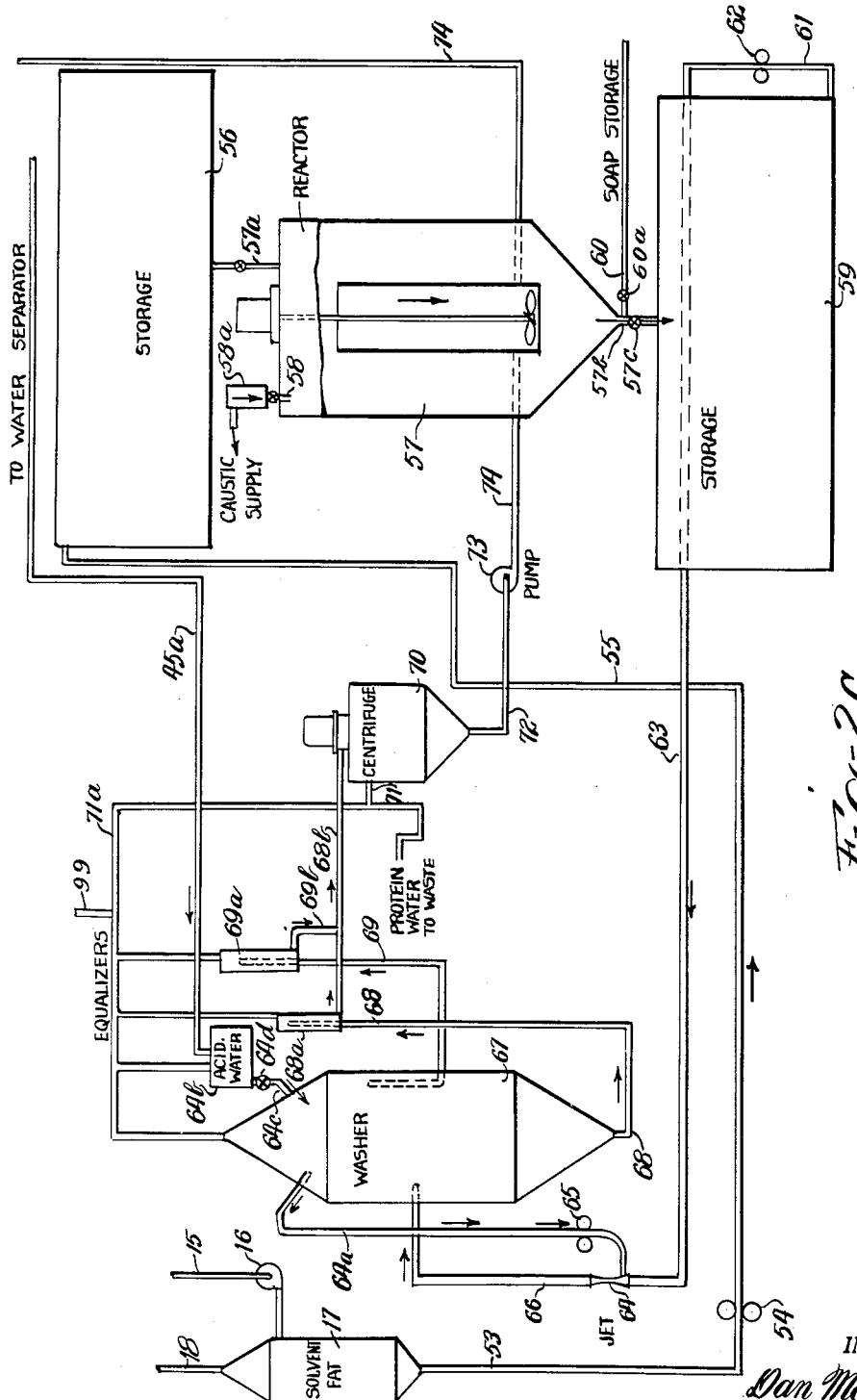

2,752,377
SOLVENT EXTRACTION PROCESS

Dan McDonald, Aurora, Ill., assignor, by mesne assignments, to Barber-Greene Company, Aurora, Ill., a corporation of Illinois Application December 4, 1950, Serial No. 198,922

6 Claims. (Cl. 260—412.8)

This invention relates to the production of fats, oils and the like from organic materials such as plant or animal materials.

The process of my invention is applicable, in its broad embodiment, to the processing of plant or animal materials from any source. In certain aspects, it is particularly applicable to the processing of fatty animal tissues such as are used in the production of lard, and will be described in detail, for purposes of illustration, as embodied in a process and apparatus for the production of lard and a protein rich residue.

In processing a fatty material, such as, for example, animal fat tissue to produce lard therefrom, a critical time period, and one which has a tremendous effect on the ultimate character and quality of the finished product, begins when the fatty tissue is removed from the animal. In conventional lard rendering methods such tissue fats for example, may be held for a varying length of time before processing thereof occurs, and it is during this storage period that fat deterioration proceeds at an accelerated rate. This deterioration is reflected in, and accompanied by, the rapid development of fatty acids, an incipient or actual rancidity and a lowering of the smoke point.

In the process of my invention, the fatty tissue is comminuted in the presence of a chlorinated solvent, which procedure I have found substantially or completely stops such deterioration. The resulting slurry may then be stored for an extended time period without further deterioration of the quality of the fat, which feature eliminates the damaging effects of holding over the fatty tissues to coincide with the time requirements of conventional rendering methods. The stabilized slurry is placed in a surge tank, large enough to hold the fatty tissues during a normal killing period, which permits the processing of such tissue to be carried out during a continuous twenty four hour per day operation. The fatty tissue is further ground or comminuted in the presence of chlorinated solvent, and heated to remove substantially all of its fat content as well as its water content, the chlorinated solvent and water component of the tissue forming an azeotrope. The resulting residue, free of fat, solvent and water, is in the form of a pleasant smelling protein composition which is light in color and finds valuable use as an animal food component, consisting almost entirely of high grade protein. The miscella, i. e., the tissue free mixture of fat in solvent, is mixed with caustic by agitation in a reactor, to saponify the free fatty acids contained therein. After saponification, the miscella and soap are separated, the miscella is treated with acidulated water to coagulate any protein present, and then freed of water and protein by centrifugation. The solvent component of the miscella is then removed by evaporation, and the resulting lard stripped of its last vestiges of solvent in a steam stripping tower. The entire system is maintained under a slight negative pressure to minimize solvent losses therefrom.

My invention is directed to a process for the production, from fat containing plant or animal material, of fats, oils, resins, waxes, and the like, and in certain cases a valuable protein rich residue, which process may be conducted as a continuous operation, effectively prevents rancidity or spoilage of the material in storage awaiting treatment, is comparatively quick with resulting proportionate increase in production, and effectively guards against objectionable loss of the solvent used. Further objects and advantages of the process of my invention will appear from the detail description.

In the drawings:

Figure 1 is a schematic view illustrating a mode of procedure in practicing the process of my invention;

Figures 2A, 2B and 2C, taken together, constitute a diagrammatic view of an apparatus lay out suitable for practicing the process of my invention; and Figure 3 is a sectional view, on an enlarged scale, taken substantially on line 3—3 of Figure 2B.

The process of my invention is particularly suitable, in certain aspects, to the extraction and refining of lard from animal tissues, and will be described in detail as used for that purpose, by way of example, it being noted, however, that the process of my invention may be used to advantage in the treatment of various organic materials containing fats, oils, waxes, resins and the like.

In accordance with the process of my invention, as used for extracting lard from fatty animal tissues, the fatty tissues are placed in a hopper 1 which is located on the killing or the cutting floor of the packing plant. The fatty tissues are then fed into a grinder 2 by means of a feed screw 3 through a pack zone 4 into the grinder. Solvent flows into the grinder 2 from the line 5. The fatty tissues are then ground through approximately one inch holes in the cutting plate of grinder 2, and the resulting slurry of fatty tissues and miscella is delivered to hopper 6 and fed by gravity to a centrifugal pump 7. The fatty tissues are thus ground in solvent promptly, preferably immediately, upon removal from the animal carcasses, before spoilage or incipient rancidity sets in. One of the important characteristics of my process is based on the stabilization of the lard which occurs when the fatty tissue is contacted with the solvent. Immediately or shortly after such contact the fatty acid content of the fatty material remains fixed, with no deterioration of the fat, and consequently no further rancidity as long as the product is in contact with the solvent. In that connection, grinding of the fatty tissue in the solvent, before incipient rancidity occurs, is of primary importance. The ground fatty tissue is thus thoroughly mixed with the solvent in intimate contact therewith and the solvent becomes immediately effective for inhibiting deterioration of the fatty tissue. The solvent used may be any suitable chlorinated hydrocarbon including carbon tetrachloride, tetrachlorethylene (perchlorethylene), ethylene dichloride, tetrachlorethane, pentachlorethane and chloroform. Preferably, I use perchlorethylene and it may be assumed, in the following explanation of the process of my invention and for purposes of description, that perchlorethylene is the solvent used.

The centrifugal pump 7 forces the slurry from hopper 6 through line 8, line 11, heat exchanger 12 and line 11a into the fat storage tank 13; it being noted that during grinding of the fatty tissues in solvent in grinder 2, valve 9 in line 8 is open and valve 10 is closed. Storage tank 13 is preferably of a size large enough so that it may hold all of the fatty tissues provided during a killing period. The practical advantage of having a tank of such a size, is that, the tank then may act as a surge tank so that the remainder of the lard producing operation may be operated on a continuous twenty-four hours per day basis. The miscella acts as a carrier for the fatty tissues being pumped from the grinder 2, located on the killing floor, to the fat storage tank 13, and the miscella component of the slurry in tank 13 is removed from the latter by gravity through line 15 and pump 16, tangentially into a separator tank 17. Any solid fatty tissue which may be entrained with the miscella rises in the miscella due to the fact that it has a lesser density than the latter. The miscella which may contain a small amount of entrained fatty tissue, passes out of the top of the separator tank 17 through line 18 into a solvent surge and storage tank 19. The miscella from tank 19 is fed through line 21, pump 20, line 5b, heat exchanger 5a and line 5 into grinder 2 on the killing floor. The heat exchanger 5a raises the temperature of the miscella to a value slightly below the boiling point of the perchlorethylene—about 250° F. The pump 20 operates only during the time that grinder 2 is in operation, that is, during the killing period. At the end of the killing period valve 9 is closed, valve 10 is opened, valve 23 between hopper and pump 7 is closed, and valve 23a in line 5 is also closed. Hopper 1, grinder 2, and hopper 6 may then be cleaned without interfering with continuation of the operation.

With valves 23 and 23a closed, and valve 10 open, as above, pump 22, which is out of operation during grinding of the fatty tissues in grinder 1, is set into operation and may then run through the remainder of the operating period. The circulating pump 22 receives miscella from tank 19 through lines 21 and 21a and delivers it, through line 11, heat exchanger 12, and line 11a to the fat storage tank 13, where lard is leached out of the fatty tissues. The heat exchanger 12 raises the temperature of the miscella, by heat derived from hot solvent vapor passing through heat exchanger 12, as will appear more fully later, to a temperature below the boiling point of the azeotrope, to about 185° F. The miscella from tank 13 is delivered to separator 17, from the top of which miscella with entrained particles of tissue passes through line 18 into tank 19, as above explained. The tank 19 is pumped empty daily, or as required, to remove the accumulated tissue therefrom.

Since the fatty tissues float on the miscella it is important that the miscella be drained from the tank 13 so that the solids conveyor 24, operating in an open conveyor housing, will deliver the fatty tissues from tank 13 to the secondary grinder 25. Miscella from the line 26 is fed into the secondary grinder 25 with fatty tissues from conveyor 24. These tissues are forced through approximately quarter inch holes in the cutting plate of grinder 25. The resulting slurry drops into a hopper 27 and passes into conveyor 28. The miscella from the conveyor 28 is delivered therefrom, through line 30, pump 29 and line 31 into tank 19. The fatty tissues discharged from hopper 27 are discharged by conveyor 28 into the tertiary grinder 32. Miscella from line 33 is introduced into grinder 32, in which the tissues are forced through one eighth inch holes in the cutting plate thereof. The slurry from grinder 32 drops into hopper 34 and thence into conveyor housing 35. The miscella from conveyor 35 is delivered, through line 36, pump 37 and line 26 to the secondary grinder 25. The drained tissues are discharged from conveyor 35 into a steam jacketed dehydrator 38. Lean miscella from overflow weir 39 of dehydrator 38 is delivered, through line 40, pump 41 and line 33 to the tertiary grinder 32. Also, if found desirable, miscella mixed with tissue may be delivered from the bottom of dehydrator 38 to pump 41, through line 40a controlled by valve 40b, and line 40, and thence through line 33 to the tertiary grinder 32.

It will be seen, from what has been said, that the fatty tissues are subjected to a succession of grinding operations in hot solvent miscella, with the degree of fineness to which the tissues are ground progressively increasing and the miscella becoming leaner with each successive grinding operation. I thus obtain genuine counter current extraction, since the tissues are exposed to a leaner and leaner miscella. Additionally, and importantly, by successively decreasing the particle size of the tissues the area of contact between the tissues and the miscella increases progressively as the fat content of the tissues decreases and the leanness of the miscella increases, which is conducive to rapid and substantially complete removal or extraction of the fat from the tissues. In using the term hot miscella I mean that the miscella is at a temperature of not less than 140° F., preferably about 185° F.

The tissues in the dehydrator 38 float on a relatively lean miscella which is kept at a temperature slightly above the boiling point—about 190° F.—of the azeotrope of the solvent with water. The moisture content of the tissues is reduced in the dehydrator 38 to about 25 to 30%. Also, during this dehydration process most of any residue of lard in the tissue is extracted therefrom. A ribbon flight conveyor screw 38a rotates slowly in the dehydrator 38 and advances such solids as may sink to the bottom of dehydrator 38 to screw 48a of a discharge screw conveyor 48. The tissues delivered to dehydrator 38 continuously displace toward the discharge end thereof the tissues floating on the miscella therein. In that manner, the tissues are continuously fed to screw 48a for discharge from dehydrator 38. The screw conveyor 48 compacts the tissues, as will be explained more fully later, pressing most of the solvent content or miscella therefrom, and provides a pack zone effectively sealing the discharge end of dehydrator 38. The miscella pressed from the tissues by screw conveyor 48 flows back into dehydrator 38, and the pressed tissue, now in meal form, is discharged through dome 48b into an underlying inclined steam jacketed drier 49. The tissue meal delivered to the drier 49 contains approximately from 25% to 40% water and 100% solvent, based on the weight of the meal, that is, about five times as much solvent as water to be removed. This solvent water ratio is important in respect to removal of solvent from the meal and drying thereof to the desired water content, in the drier 49. The pressing of most of the miscella from the tissue in the screw conveyor 48 assures the proper approximate solvent water ratio in the meal delivered to drier 49, and is an important feature of the process. The azeotropic vapor evolved in the dehydrator 38 goes through line 42 into condenser 43, the condensate from which passes through pipe 44 into a water separator 45, where continuous gravity decantation removes the water from the system through line 45a. The condenser 43 may be a water cooled condenser of suitable known type. The solvent from the water separator 45 passes through lines 46 and 47 to the discharge end of dehydrator 38, where it is sprayed onto the tissues going to the screw conveyor 48, for the final lard extraction. A ribbon flight conveyor screw 49a in drier 49 continuously moves the protein meal toward the upper end thereof. The screw 49a rotates at approximately 1 R. P. M. so that the meal is tumbled against the hot jacketed surface of drier 49, in which any remaining solvent is removed from the meal. The inclination of the drier 49 results in stratification of solvent vapors and steam. The steam jacket of drier 49 is divided, lengthwise thereof, into three zones or sections, which may be of about the same length, to which steam is supplied through steam lines 104. In the two lower zones of drier 49 the meal is heated to about 200° F., and in the top zone it is heated to about 220° F. The solvent in the meal, with most of the water content thereof, is driven off in the two lower zones of drier 49, in the form of azeotropic vapor. When the meal enters the top zone of drier 49 it is solvent free and has a water content of about 8%, of which about 2% is driven off in the top zone. The meal is discharged from drier 49 by means of a discharge screw conveyor 50, to be described more fully later, and is solvent free and has a moisture content of about 6%. The solvent vapors being relatively heavy tend to travel to and remain at the bottom of the drier 49, while the water vapor being lighter tends to travel to and remain at or near the top of the drier 49. The azeotropic vapor from the lower portion of drier 49 passes through line 103 into the condenser 43. Stratification in the drier 49 prevents loss of solvent through the protein meal discharge screw conveyor 50. The screw conveyor 50 provides a pack zone sealing to atmosphere the upper end of drier 49 and further guarding against loss of solvent, which is an important consideration, while also permitting operation of the equipment at desired pressures. Steam may be introduced through line 52 into the upper end of the drier 49 as a safety measure to assure complete removal of the solvent from the protein meal. Steam is supplied to the steam jacket of the dehydrator through steam line 105, and the condensate water from the steam jackets of drier 49 and dehydrator 38 is taken off through lines 106 and 107.

The miscella from the bottom of separator tank 17 is fed through line 53 to a positive displacement pump 54, which discharges through line 55 into a storage tank 56. The fat rich miscella from the storage tank 56 is fed through line 57a into an agitator reactor vessel 57, to which caustic is supplied through line 58 from caustic tank 58a. Saponification of the free fatty acids takes place in reactor 57, and the resulting soap which forms floats on the miscella. The rising soap contains no occluded fat because of the fact that the fat is soluble in the solvent. After the saponification reaction has been completed the miscella is withdrawn from the bottom of the tank 57, through line 57b controlled by valve 57c, into a storage tank 59, and the soap is withdrawn from the bottom of the same tank, after the miscella has been drawn off, through line 60 controlled by valve 60a.

Some protein removal is accomplished in the reactor 57 because of the coagulation of the protein which floats with the soap. The miscella from storage tank 59, free of free fatty acids, is continuously removed through line 61, pump 62, and line 63 into a Venturi mixer 64, where acidulated water is introduced from the upper portion of washer 67, through line 64a and pump 65 into the miscella stream. Acidulated water is supplied to the upper portion of washer 67 from a tank 64b, through line 64c controlled by valve 64d. This acidulated water-miscella mixture is fed through line 66 tangentially into washer tank 67 a short distance below the solvent-water interface therein. Miscella from the bottom of the washer tank 67 is delivered through line 68 into a well 68a from which it flows through line 68b into a centrifuge 70. Protein water from a short distance above the interface of the solvent-water layer in washer 67 flows through pipe 69 into a well 69a and thence through line 69b and line 68b to centrifuge 70. The centrifuge 70 separates the miscella from the water and protein, and the protein water is removed from the centrifuge through the valve controlled line 71. The wells 68a and 69a and line 71 are connected to the top of washer 67 by an equalizer line 71a. Water from the separator 45 and which contains some solvent, may be delivered to the acidulated water tank 64b through line 45a, which is provided with suitably disposed control valves.

The miscella is delivered from the centrifuge 70 through line 72, centrifugal pump 73, line 74, heat exchanger 75, which elevates the miscella temperature to 190° F., and line 78a to still 76. In the present embodiment, still 76 operates in series with a second still 77 to evaporate the solvent from the miscella. The vapors from still 77 go through vapor line 78 to heat exchanger 75 to raise the still entrance temperature of the miscella. The solvent vapor from stills 76 and 77 is led through vapor line 79—79a and heat exchanger 12. The condensed solvent from the heat exchangers 75 and 12 passes through lines 80a, 80 and 47 into dehydrator 38 for washing of the tissues, as above explained. The uncondensed vapor from the heat exchanger 12 passes through line 81 into the entrance of the retort 38. Steam is supplied to the jackets of stills 76 and 77 through lines 108 and 109 and the condensate is taken off through lines 110. The lard from still 76 flows through line 111 into still 77. The lard, substantially free of solvent, is removed from still 77 through line 82 to float chamber 83 and thence through line 84 to stripping tower 85. The float chamber 83 permits operation of the tower 85 at various pressures. The lard cascades downward over Raschig rings or similar packing material in tower 85 while stripping steam from line 86 enters the bottom of the tower 85 and rises upward therein to a vapor line 87. This steam strips the solvent from the lard. The lard is then removed from tower 85 through line 88 and pump 89 to the packing equipment. The vapor, consisting of steam and solvent, passes from tower 85 through line 87, condenser 90, vacuum pump 91 and line 92 to condenser 43, from which the condensate flows into the separator 45 as previously noted. The condenser 90 may be a water cooled condenser of suitable known type.

Preferably a slight negative pressure is maintained on the entire plant by means of a positive displacement blower 93, through line 94, carbon adsorber 95 and line 96 to water separator 45. This negative pressure helps to eliminate solvent losses from the system. When the carbon adsorber becomes saturated with solvent vapor it may be regenerated by passing steam therethrough. To that end a three way valve 112 is provided at the juncture of a steam line 97 with line 94, a check valve 113, opening toward adsorber 95 and closing toward separator 45, is placed in line 96, and a check valve 114, opening toward condenser 43 and closing toward adsorber 95, is placed in line 98. Normally valve 112 is in position closing steam line 97 and opening line 94. When valve 112 is turned to its other position, line 94 is closed to the blower 93 and steam flows through adsorber 95 and line 98 into condenser 43, the condensate from which flows into separator 45. In that manner, solvent is recovered from the adsorber 95 thereby guarding against loss of solvent to the atmosphere. That avoids loss of solvent with a corresponding saving in expense, an important practical consideration. Further, the carbon adsorber 95 assures that the air discharged from blower 93 is solvent free and odorless, also an important consideration. An equalizer line 99 is connected to the top of tank 19 and to the various grinding heads and equalizer lines 71a. Solvent vapor is led from still 76, through lines 79, 100, and 99 to tank 19 and the grinding heads, for equalizing the pressure therein and, also, minimizing heat losses.

The delivery of hot solvent vapor from stills 76 and 77 through line 79—100 and line 78—81 to the dehydrator 38 is an important feature of my process in respect to heat economy and consequent saving in cost of operation. For each one hundred pounds of material delivered to the dehydrator 38, approximately eight hundred pounds of solvent—perchlorethylene—is delivered to the still 76, at a temperature of 190° F., together with the fat dissolved therein and forming therewith a miscella. In the still 76 the temperature of the solvent is raised 60° F., to its boiling point 250° F. The specific heat of the solvent is about 0.2, requiring 9,600 B. t. u.'s to raise the temperature of the solvent in still 76 to its boiling point. Assuming no heat extracted from the solvent vapor in the heat exchangers, eight hundred pounds of solvent, in the form of vapor at a temperature of 250° F. flows from stills 76 and 77 through lines 79—100 and 78—81 into dehydrator 38. The solvent vapor entering the dehydrator 38 provides the solvent phase of the azeotropic vapor evolved in dehydrator 38 and its temperature is reduced to the boiling point of the azeotrope—190° F. That releases the 60° F. superheat from the entering hot solvent vapor, which 60° F. then becomes available for heating the material in the dehydrator 38. In that manner the 9,600 B. t. u.'s put into the solvent vapor in stills 76 and 77 is recovered and utilized in the dehydrator 38. The latent heat of the solvent vapor is 90 B. t. u.'s per pound so that the eight hundred pounds of solvent vapor entering the dehydrator 38 has a heat content of 81,600 B. t. u.'s over 190° F. Each one hundred pounds of material treated in dehydrator 38 requires the evaporation of eighty pounds of water and the resultant water vapor flowing to the condenser 43 takes off with it, in the azeotropic vapor produced, four hundred and twenty-four pounds of solvent vapor. If the water and the solvent were evaporated as an azeotrope without introducing hot solvent vapor into the dehydrator 38, a heat input of 115,760 B. t. u.'s would be required, disregarding heat losses—38,160 B. t. u.'s for the solvent and 77,600 for the water. By returning the hot solvent vapor at a temperature of 250° F. to the dehydrator 38 necessity for vaporizing solvent in dehydrator 38 is eliminated thereby effecting a saving of 38,160 B. t. u.'s. Also, a further saving of 9,600 B. t. u.'s is effected by the 60° F. superheat of the hot solvent vapor entering dehydrator 38, which superheat is utilized for heating the material. As will be seen from the above, by returning the hot solvent vapor to the dehydrator, I effect a saving in heat, as compared to processes in which the solvent vapor is not returned from the still to the dehydrator, of approximately 47,760 B. t. u.'s, an important consideration in processes of this character.

The dehydrator 38 is provided, at the discharge end thereof, with a frusto-conical extension 38b from which extends a reduced cylindrical neck 38c inclined upwardly from extension 38b and disposed above the liquid level in dehydrator 38, maintained at about the axis of the ribbon flight screw 38a. Neck 38c extends into dome 48b extending upward from and opening into drier 49. A disc 120 is slidably mounted on shaft 48c of conveyor screw 48a. Disk 120 is urged toward the upper end of neck 38c by a compression spring 121 disposed about shaft 48c and confined between disc 120 and the opposite inclined wall of hood 48b. A multiple armed scraper 122 is slidably mounted on a squared element 123 of shaft 48c for rotation therewith, at the inner face of disc 120. The conveyor screw 48a terminates a material distance from disc 120, providing a space into which the tissue is packed by the action of screw 48a, providing a plug or seal pack 124. As the pressure on the plug or seal pack 124 increases, the disc 120 is forced away from the outer end of neck 38c and the protruding end of the plug 124 is sheared off by the scraper 122, the removed tissue dropping downward through dome 48b into dried 49. The plug 124 provides a seal pack effectively guarding against escape of solvent vapor from the dehydrator 38, as above explained. The screw conveyor 50, like the conveyor 48, is provided with a disc 125 urged in closing direction by a compression spring 126 disposed about shaft 127 of its screw, and confined between disc 125 and an abutment 128 on shaft 127. The conveyor 50 also has a multiple armed scraper (not shown) slidable on a squared element of shaft 127. That provides for discharge of the meal from screw conveyor 50 while sealing the latter to atmosphere, in the same manner as in screw conveyor 48. The conveyor 50 is steam jacketed, receiving steam from the first or top section of the steam jacket of drier 49, to guard against a cold spot and resultant condensation of vapor or steam from within drier 49. Condensate from the steam jacket of conveyor 50 may be taken off through a line or pipe 130.

The process of my invention has been described as used for extracting lard from animal fat, by way of example. As above indicated, it may be used for treatment of various organic materials and in some aspects is well suited to the recovery of fats, oils, waxes, resins and analogous substances from such materials. Accordingly, the term "fat" as used herein and in the appended claims, is to be construed as inclusive of oleaginous substances and substances generally similar thereto in character, such as fats, oils, waxes, resins and the like.

I claim:
1. The process of extracting fat from fat containing material, which comprises subjecting the material to successive separate grinding operations in a hot chlorinated solvent and thereby progressively reducing the particle size of the ground material, separating the slurry resulting from individual grinding operations into a miscella fraction, and a fraction containing substantially all of the ground material, and successively grinding the said separated fractions of ground material in the presence of a miscella fraction separated from a slurry formed after the next succeeding grinding operation.

2. The process of extracting oleaginous substances from materials containing such substances, which comprises subjecting the material to successive grinding operations in a hot chlorinated solvent and thereby progressively reducing the particle size of the ground material, separating the slurry resulting from individual grinding operations into a miscella fraction of solvent and oleaginous substance dissolve therein, and a fraction containing substantially all of the ground material and successively grinding the said separated fractions of ground oleaginous material in the presence of a miscella separated from a slurry formed after the next succeeding grinding operation.

3. The process of treating fat-containing material, which comprises comminuting fat-containing material in a hot chlorinated solvent to form a slurry of undissolved material and a miscella of solvent and fat, separating the slurry into a fraction rich in undissolved material and a fraction rich in solvent and fat, grinding the fraction rich in undissolved material in the presence of a miscella fraction, leaner than the first said miscella fraction, said leaner miscella fraction being separated from a slurry formed after the next succeeding grinding operation, and refining the fat component of the miscella in the presence of the chlorinated solvent component thereof.

4. The process of treating fatty tissue, which comprises comminuting fatty tissue in a hot chlorinated solvent to form a slurry of undissolved fatty tissue and a miscella of solvent and fat, separating the undissolved tissue from the slurry and subjecting the separated tissue to a progressively leaner miscella counter-currentwise to remove substantially all of the fat therefrom, dehydrating the resulting substantially fat free tissue, refining the tissue free component of the miscella in the presence of the chlorinated solvent component thereof, separating the resulting soap from the miscella, and washing the miscella with acidulated water to coagulate and remove protein therefrom.

5. The process of treating fatty tissue, which comprises comminuting fatty tissue in a hot chlorinated solvent to form a slurry of fatty tissue and a miscella of solvent and fat, contacting the tissue rich slurry with solvent vapors to form azeotropes with the water component of said tissue whereby to dehydrate said tissue, separating said azeotropes into their water and solvent components, acidulating said solvent saturated water, contacting said miscella with caustic to saponify the free fatty acids therein, separating the miscella from the soap, washing the soap free miscella with said acidulated water to coagulate and remove protein therefrom, and separating refined fat from the resulting mixture of miscella water and protein.

6. The process of extracting fat from fatty tissue, which comprises subjecting the tissue to successive separate comminuting operations in a hot chlorinated solvent and thereby progressively reducing the particle size of the comminuted tissue, supplying to the tissue during each of several of the successive comminuting operations solvent-fat miscella substantially free of fatty tissue derived from the next subsequent comminuting operation, thereby progressively extracting fat from the tissue during each comminuting operation with solvent progressively leaner in fat content.

(References on following page)

References Cited in the file of this patent

UNITED STATES PATENTS

| | | |
|---|---|---|
| 1,104,456 | Turner | July 21, 1914 |
| 1,934,677 | Ash | Nov. 14, 1933 |
| 2,158,427 | Reichert | May 16, 1939 |
| 2,260,731 | Thurman | Oct. 28, 1941 |
| 2,467,404 | Pascal | Apr. 19, 1949 |
| 2,567,179 | Bonotto | Sept. 11, 1951 |
| 2,616,908 | Colbeth et al. | Nov. 4, 1952 |
| 2,695,304 | Barns | Nov. 23, 1954 |

FOREIGN PATENTS

| | | |
|---|---|---|
| 183,825 | Great Britain | of 1922 |